(12) United States Patent
Conrad et al.

(10) Patent No.: US 11,072,023 B2
(45) Date of Patent: Jul. 27, 2021

(54) CRYOCOOLER CONTAINING ADDITIVELY-MANUFACTURED HEAT EXCHANGER

(71) Applicant: Raytheon Company, Waltham, MA (US)

(72) Inventors: Theodore J. Conrad, Redondo Beach, CA (US); James R. Chow, San Gabriel, CA (US); Craig A. Armiento, Acton, MA (US); William E. Elias, Manhattan Beach, CA (US)

(73) Assignee: Raytheon Company, Waltham, MA (US)

(*) Notice: Subject to any disclaimer, the term of this patent is extended or adjusted under 35 U.S.C. 154(b) by 706 days.

(21) Appl. No.: 15/423,961

(22) Filed: Feb. 3, 2017

(65) Prior Publication Data

US 2017/0146267 A1 May 25, 2017
US 2018/0180329 A9 Jun. 28, 2018

Related U.S. Application Data

(63) Continuation of application No. PCT/US2015/037993, filed on Jun. 26, 2015, which
(Continued)

(51) Int. Cl.
*F25B 9/14* (2006.01)
*B22F 9/24* (2006.01)
(Continued)

(52) U.S. Cl.
CPC ............... *B22F 9/24* (2013.01); *B01J 19/123* (2013.01); *B22F 1/0018* (2013.01); *B33Y 10/00* (2014.12);
(Continued)

(58) Field of Classification Search
CPC .......... F25B 9/14–145; F25B 2309/003; F25B 2309/1415–1416
See application file for complete search history.

(56) References Cited

U.S. PATENT DOCUMENTS

| 5,613,365 A | 3/1997 | Mastrup et al. |
| 6,093,504 A | 7/2000 | Bliesner |

(Continued)

FOREIGN PATENT DOCUMENTS

| CN | 202928220 U | 5/2013 |
| EP | 2123723 A1 | 11/2009 |

(Continued)

OTHER PUBLICATIONS

Japanese Patent Office, Notification of Reasons for Refusal in Application No. JP 2017-512042 dated Mar. 30, 2018, 17 pages.
(Continued)

*Primary Examiner* — Brian M King

(57) ABSTRACT

An apparatus includes a heat exchanger configured to transfer heat to a fluid and to absorb heat from the fluid as the fluid flows between a warm end and a cold end of a cryocooler. The heat exchanger includes at least one section having a substrate of at least one allotropic form of carbon and a layer of nanoparticles on or over the substrate. The heat exchanger could include multiple sections, and each section could include one of multiple substrates and one of multiple layers of nanoparticles. The heat exchanger can further include pores through the multiple sections of the heat exchanger, where the pores are configured to allow the fluid to flow through the heat exchanger and to contact the substrates and the layers of nanoparticles. The nanoparticles could include at least one lanthanide element or alloy, and the substrate could include carbon nanotubes or graphene.

21 Claims, 6 Drawing Sheets

Related U.S. Application Data is a continuation-in-part of application No. 14/542,150, filed on Nov. 14, 2014, now Pat. No. 10,421,127.

(60) Provisional application No. 62/045,112, filed on Sep. 3, 2014, provisional application No. 62/060,234, filed on Oct. 6, 2014.

(51) Int. Cl.

| | |
|---|---|
| *B01J 19/12* | (2006.01) |
| *F28F 13/18* | (2006.01) |
| *F28F 21/02* | (2006.01) |
| *B22F 1/00* | (2006.01) |
| *C09D 11/037* | (2014.01) |
| *C09D 11/322* | (2014.01) |
| *C09D 11/52* | (2014.01) |
| *F25B 9/00* | (2006.01) |
| *F28F 19/02* | (2006.01) |
| *B41J 2/01* | (2006.01) |
| *B33Y 10/00* | (2015.01) |
| *B33Y 80/00* | (2015.01) |
| *F28D 21/00* | (2006.01) |

(52) U.S. Cl.
CPC ............. *B33Y 80/00* (2014.12); *B41J 2/01* (2013.01); *C09D 11/037* (2013.01); *C09D 11/322* (2013.01); *C09D 11/52* (2013.01); *F25B 9/00* (2013.01); *F25B 9/145* (2013.01); *F28F 13/18* (2013.01); *F28F 13/185* (2013.01); *F28F 19/02* (2013.01); *F28F 21/02* (2013.01); *B22F 2202/11* (2013.01); *B22F 2999/00* (2013.01); *F25B 2309/1412* (2013.01); *F25B 2309/1415* (2013.01); *F28D 2021/0033* (2013.01); *F28F 2245/00* (2013.01); *F28F 2255/20* (2013.01)

(56) References Cited

U.S. PATENT DOCUMENTS

| | | | |
|---|---|---|---|
| 7,789,935 | B2 | 9/2010 | Chretien et al. |
| 8,101,730 | B2 | 1/2012 | Kuboshima |
| 8,282,860 | B2 | 10/2012 | Chung et al. |
| 2003/0032192 | A1 | 2/2003 | Haubold et al. |
| 2004/0000149 | A1* | 1/2004 | Kirkconnell ............ F25B 9/145 62/6 |
| 2004/0213899 | A1 | 10/2004 | Wang |
| 2005/0217280 | A1 | 10/2005 | Gschneidner, Jr. et al. |
| 2006/0210636 | A1 | 9/2006 | Nonninger et al. |
| 2009/0250106 | A1* | 10/2009 | Hayashi ............. H01L 31/1884 136/256 |
| 2011/0048171 | A1 | 3/2011 | Enright et al. |
| 2011/0186270 | A1* | 8/2011 | Chou ...................... F28F 21/02 165/104.28 |
| 2012/0157320 | A1* | 6/2012 | Yamada ................... B22F 9/08 505/162 |
| 2014/0083094 | A1* | 3/2014 | Elison ................. H01L 23/467 60/527 |
| 2014/0219906 | A1 | 8/2014 | Kim et al. |
| 2015/0048526 | A1* | 2/2015 | Kim ........................ B05D 1/185 261/75 |
| 2015/0165056 | A1 | 6/2015 | Omary et al. |
| 2015/0225549 | A1 | 8/2015 | Kim et al. |

FOREIGN PATENT DOCUMENTS

| | | |
|---|---|---|
| JP | H0854150 A | 2/1996 |
| JP | H10-185339 A | 7/1998 |
| JP | 2828978 B2 | 11/1998 |
| JP | 2001-505638 A | 4/2001 |
| JP | 2009-280812 A | 12/2009 |
| WO | 2013/152314 A1 | 10/2013 |
| WO | 2013166521 A1 | 11/2013 |

OTHER PUBLICATIONS

Japanese Patent Office, Decision of Refusal in Application No. JP 2017-512042 dated Oct. 9, 2018, 12 pages.
Foreign Communication from a Related Counterpart Application, PCT Application No. PCT/US2015/037933, International Search Report dated Sep. 30, 2015, 4 pages.
Foreign Communication from a Related Counterpart Application, PCT Application No. PCT/US2015/037933, Written Opinion of the International Searching Authority dated Sep. 30, 2015, 6 pages.
Zivkovic, O.; "Ternary Nanomaterials: Synthesis by Alkalide Reduction and Characterization"; 2010; 221 pages.
Sato, et al.; "Sensitized Photoreduction of Silver Ions in the Presence of Acetophenone"; Journal of Photochemistry and Photobiology A: Chemistry; 127.1; 1999; 5 pages
Conrad, et al. "Cryocooler Regenerator Containing One or More Carbon-Based Anisotropic Thermal Layers"; U.S. Appl. No. 14/151,408; 23 pages.
Cushing, et al.; "Recent Advances in the Liquid-Phase Syntheses of Inorganic Nanoparticles"; Chemical Review; 104, No. 9; 2004; 54 pages.
Eustis, Susie; "Gold and Silver Nanoparticles: Characterization of their Interesting Optical Properties and the Mechanism of their Photochemical Formation"; 2006; 290 pages.
Kapoor, S.; "Preparation, Characterization, and Surface Modification of Silver Particles"; Langmuir 14.5; 1998; 5 pages.
Kapoor, et al.; "Photochemical Formation of Copper Nanoparticles in poly (N-Vinylpyrrolidone)"; Chemical Physics Letters; 370.1; 2003; 5 pages.
Kometani, et al.; "Laser Flash Photolysis Study of the Photochemical Formation of Colloidal Ag Nanoparticles in the Presence of Benzophenone." PCCP; 4.20; (2002); 6 pages.
Korchev, et al.; "Polymer-Initiated Photogeneration of Silver Nanoparticles in SPEEK/PVA Films: Direct Metal Photopatterning"; J. Am. Chem. Soc.; 126.1; 2004; 2 pages.
Mooney, et al.; "Nanocrystalline Co 30 Fe 70 Alloy Synthesized by Alkalide Reduction"; Journal of Materials Chemistry; 19; 2009; 6 pages.
Nelson, et al.; "Solution Synthesis of Gadolinium Nanoparticles"; Journal of the American Chemical Society; 124.12 ; 2002; 5 pages.
Nelson, et al.; "Dysprosium Nanoparticles Synthesized by Alkalide Reduction"; Journal of Materials Chemistry; 13; 2003; 4 pages.
Nader Shehata, et al., "Reduced erbium-doped ceria nanoparticles: one nano-host applicable for simultaneous optical down-and up-conversions", Nanoscale Research Letters, May 13, 2014, 6 pages.
Foreign Communication from a Related Counterpart Application, PCT Application No. PCT/US2015/039034, International Search Report and Written Opinion of the International Searching Authority dated Sep. 22, 2015, 11 pages.
Foreign Communication from a Related Counterpart Application, PCT Application No. PCT/US2015/037933, Preliminary Report on Patentability dated Mar. 16, 2017, 8 pages.
Examination report No. 1 for standard patent application dated Nov. 12, 2019 in connection with Australian Patent Application No. 2015312420, 4 pages.
Office Action dated Nov. 5, 2019 in connection with Japanese Patent Application No. 2017-512042, 6 pages.
Japanese Patent Office, Notice of Reasons for Refusal in connection with counterpart Japanese Patent Application No. 2019-010185 dated Jan. 28, 2020, 20 pages.
Official Action in connection with counterpart Israeli Patent Application No. 249815 dated Jun. 22, 2020, 4 pages
Office Action dated Sep. 8, 2020 in connection with counterpart Japanese Patent Application No. 2019-010185, 13 pages.
Office Action dated Aug. 16, 2020 in connection with counterpart Israeli Patent Application No. 250488, 10 pages.

* cited by examiner

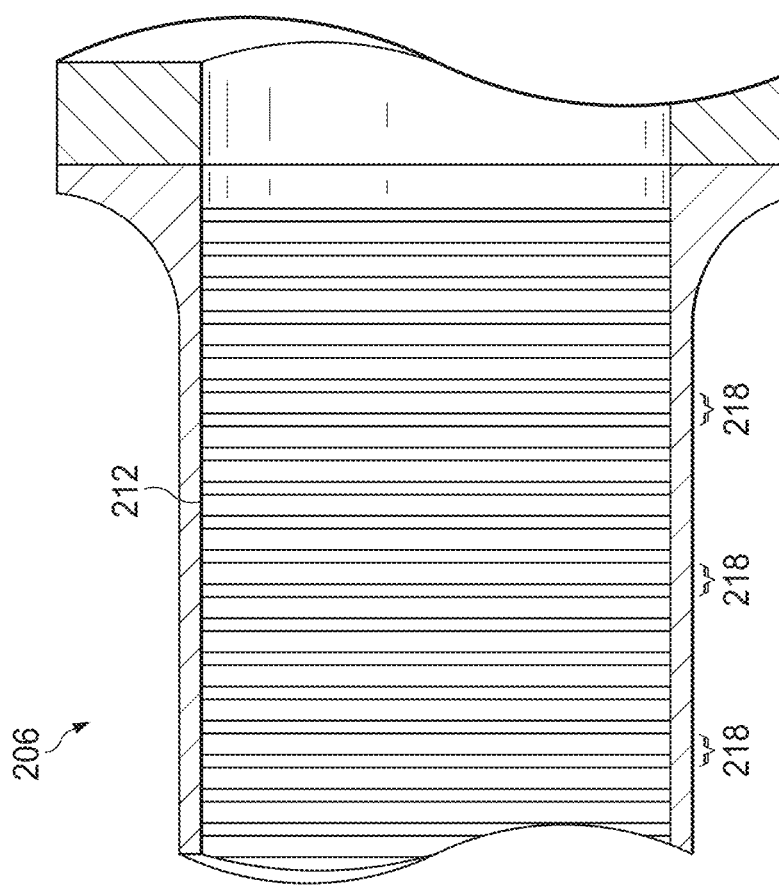

CRYOCOOLER CONTAINING ADDITIVELY-MANUFACTURED HEAT EXCHANGER

CROSS-REFERENCE TO RELATED APPLICATIONS AND PRIORITY CLAIM

This application is a continuation of International Patent Application No. PCT/US2015/037993 filed on Jun. 26, 2015, which claims priority to U.S. Patent Application No. 62/045,112 filed on Sep. 3, 2014, U.S. Patent Application No. 62/060,234 filed on Oct. 6, 2014 and U.S. patent application Ser. No. 14/542,150 filed on Nov. 14, 2014, all of which are hereby incorporated by reference in their entireties.

TECHNICAL FIELD

This disclosure is generally directed to cooling systems. More specifically, this disclosure is directed to a cryocooler that contains an additively-manufactured heat exchanger and related system and methods.

BACKGROUND

Cryocoolers are often used to cool various components to extremely low temperatures. For example, cryocoolers can be used to cool focal plane arrays in different space and airborne imaging systems. There are various types of cryocoolers having differing designs, such as pulse tube cryocoolers, Stirling cryocoolers, Gifford-McMahon cryocoolers, turbo-Brayton cryocoolers, and Joule-Thomson cryocoolers. These types of cryocoolers include a regenerator or recuperative heat exchanger, which typically exchanges heat with a fluid (such as liquid or gas) flowing back and forth in a cryocooler. Heat is stored in and released from the regenerator or recuperative heat exchanger to support the cooling operations of a cryocooler. For simplicity, the phrase "heat exchanger" in this patent document includes regenerators, recuperative heat exchangers, and other structures that exchange heat with a fluid flowing in a cryocooler.

Various designs have been employed in attempts to obtain lower and lower temperatures in a cryocooler. These designs have included the use of glass fibers, metal foams, stacked screens, lead and rare earth spheres, and photo-etched disks. However, providing refrigeration at cryogenic temperatures becomes increasingly more difficult as the desired temperature decreases. For example, one obstacle to providing more efficient cooling below a temperature of about 20 Kelvin (about −423.7° F.) is the inadequacy of currently-available heat exchangers. In this temperature range, low volumetric specific heat and low thermal conductivity generally impede the effectiveness of heat transfers to and from a heat exchanger. Moreover, current low-temperature heat exchangers typically have low porosity and operate at low frequencies, which can significantly limit a cryocooler's efficiency.

SUMMARY

This disclosure provides a cryocooler that contains an additively-manufactured heat exchanger and related system and methods.

In a first embodiment, an apparatus includes a heat exchanger configured to transfer heat to a fluid and to absorb heat from the fluid as the fluid flows between a warm end and a cold end of a cryocooler. The heat exchanger includes at least one section having a substrate of at least one allotropic form of carbon and a layer of nanoparticles on or over the substrate In a second embodiment, a method includes forming a heat exchanger for a cryocooler. Forming the heat exchanger includes forming multiple sections of the heat exchanger. Each section of the heat exchanger includes a substrate of at least one allotropic form of carbon and a layer of nanoparticles on or over the substrate.

In a third embodiment, a method includes forming a heat exchanger for a cryocooler. Forming the heat exchanger includes forming multiple sections of the heat exchanger. Each section of the heat exchanger includes a substrate and a layer of metal on or over the substrate such that the heat exchanger includes alternating substrates and layers of metal.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 2A and 2B illustrate a second example cryocooler having a heat exchanger that contains one or more portions created using additive manufacturing in accordance with this disclosure;

DETAILED DESCRIPTION

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
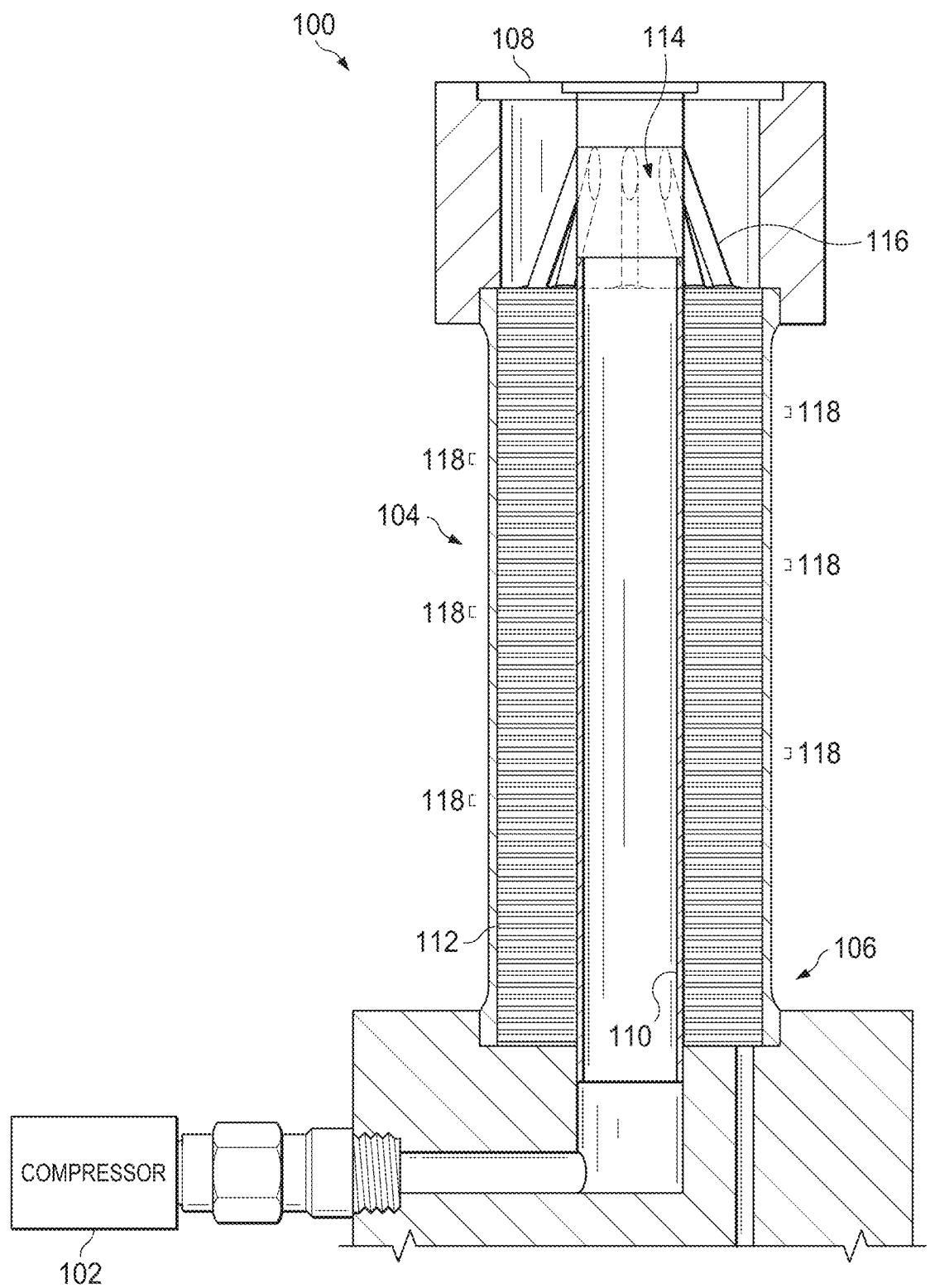
FIG. 1 illustrates a first example cryocooler having a heat exchanger that contains one or more portions created using additive manufacturing in accordance with this disclosure.

FIG. 1 illustrates a first example cryocooler 100 having a heat exchanger that contains one or more portions created using additive manufacturing in accordance with this disclosure. More specifically, FIG. 1 illustrates a pulse tube cryocooler having a regenerator, where portions of the regenerator are created using additive manufacturing.

As shown in FIG. 1, the cryocooler 100 includes a compressor 102 and an expander assembly 104. The compressor 102 creates a flow of fluid within the expander assembly 104. For example, the compressor 102 could include a piston that strokes back and forth during each compression cycle, where multiple compression cycles occur at a specified drive frequency. The piston can therefore push the fluid into the expander assembly 104 and draw the fluid out of the expander assembly 104 during operation of the compressor 102. The compressor 102 includes any suitable structure for moving at least one gas or other fluid(s) in a cooling system.

Fluid is pushed into and pulled out of the expander assembly 104 by the compressor 102. This back and forth motion of the fluid, along with controlled expansion and contraction of the fluid, creates cooling in the expander assembly 104. In this example, the expander assembly 104 has a warm end 106 and a cold end 108. As the names imply, the warm end 106 of the expander assembly 104 is at a higher temperature than the cold end 108 of the expander assembly 104. The cold end 108 of the expander assembly 104 could reach any suitably low temperature, such as down to about 4 Kelvin (about −452.5° F.) or even lower depending on the design. The cold end 108 of the expander assembly 104 can therefore, for example, be thermally coupled to a device or system to be cooled.

The expander assembly 104 includes a pulse tube 110 and a regenerator 112. The pulse tube 110 represents a passageway through which the fluid can move or pulse back and forth. The regenerator 112 represents a structure that contacts the fluid and exchanges heat with the fluid. For example, when the fluid passes from the warm end 106 to the cold end 108 of the expander assembly 104, heat from the fluid can be absorbed by the regenerator 112. When the fluid passes from the cold end 108 to the warm end 106 of the expander assembly 104, heat from the regenerator 112 can be absorbed by the fluid.

The pulse tube 110 includes any suitable structure for holding a fluid that pulses or otherwise moves back and forth during multiple cycles. The pulse tube 110 could be formed from any suitable material(s) and have any suitable size, shape, and dimensions. The pulse tube 110 could also be fabricated in any suitable manner.

The cold end 108 of the expander assembly 104 includes a heat exchanger 114 and coupling channels 116. The heat exchanger 114 generally operates to remove heat at the cold end 108 of the expander assembly 104. The coupling channels 116 fluidly couple the heat exchanger 114 and the regenerator 112.

As described in more detail below, the regenerator 112 includes multiple portions 118 that are partially or completely fabricated using additive manufacturing. For example, in some embodiments, each portion 118 can include (i) a substrate formed from at least one allotropic form of carbon and (ii) nanoparticles on or over the substrate. However, other substrates and/or materials on or over the substrates could also be used.

Figure 2A:
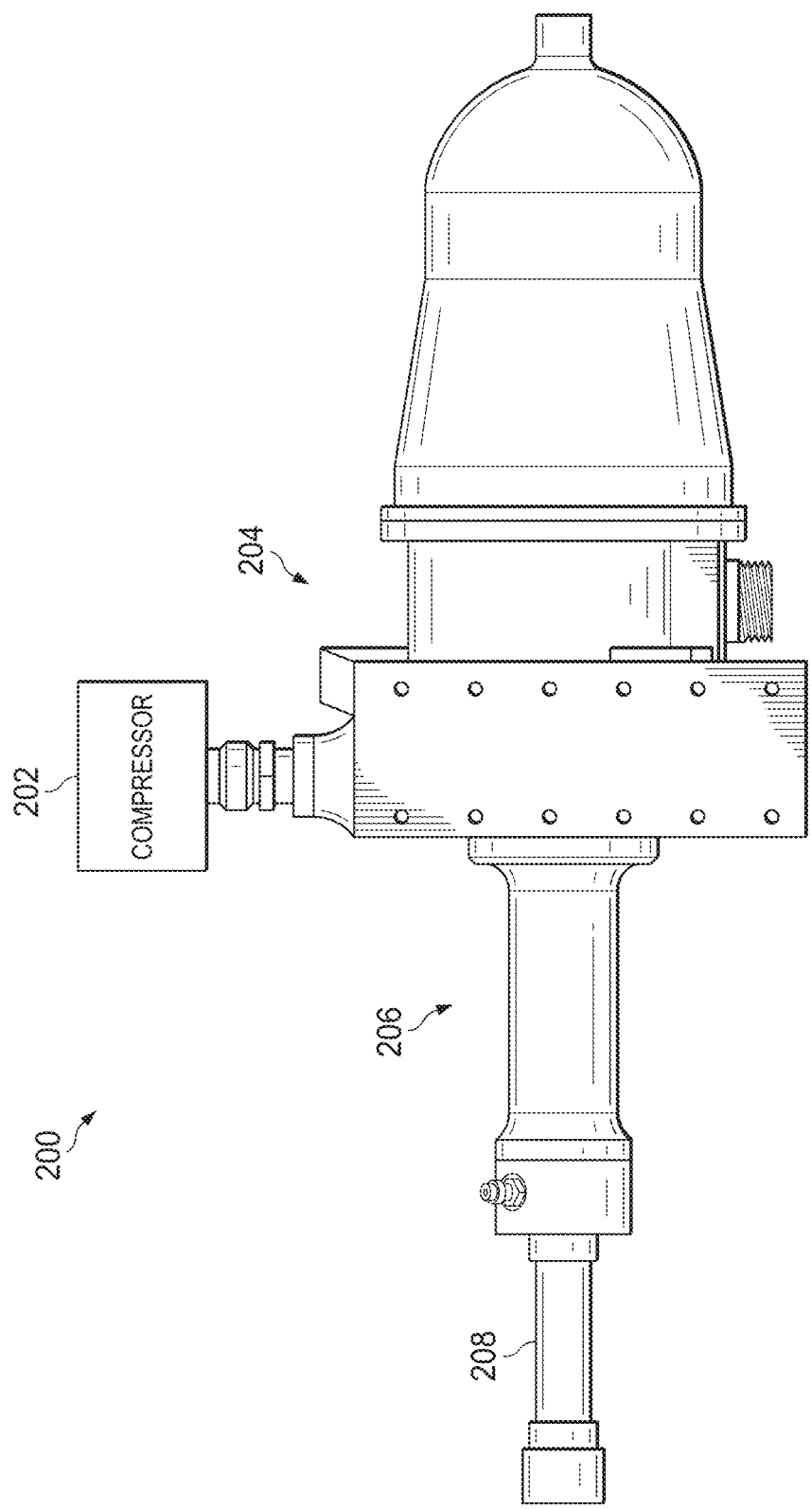

FIGS. 2A and 2B illustrate a second example cryocooler 200 having a heat exchanger that contains one or more portions created using additive manufacturing in accordance with this disclosure. More specifically, FIGS. 2A and 2B illustrates a two-stage Stirling cryocooler having a regenerator, where portions of the regenerator are created using additive manufacturing.

As shown in FIGS. 2A and 2B, a compressor 202 is fluidly coupled to an expander assembly 204 and causes fluid to move back and forth within the expander assembly 204. Any suitable compressor 202 could be used in the cryocooler 200. The expander assembly 204 represents part of a first stage 206 of the two-stage Stirling cooling system. A second stage 208 of the Stirling cooling system includes a pulse tube.

Part of the first stage 206 is shown in greater detail in FIG. 2B. As shown in FIG. 2B, the first stage 206 includes a regenerator 212 through which the fluid traveling within the first and second stages 206-208 passes. Once again, the regenerator 212 represents a structure that contacts the fluid and exchanges heat with the fluid. For example, when the fluid passes right to left through the regenerator 212 in FIG. 2B, heat from the fluid can be absorbed by the regenerator 212. When the fluid passes left to right through the regenerator 212 in FIG. 2B, heat from the regenerator 212 can be absorbed by the fluid.

As described in more detail below, the regenerator 212 includes multiple portions 218 that are partially or completely fabricated using additive manufacturing. In some embodiments, each portion 218 can include (i) a substrate formed from at least one allotropic form of carbon and (ii) nanoparticles on or over the substrate. However, other substrates and/or materials on or over the substrates could also be used.

Although FIGS. 1, 2A, and 2B illustrate examples of cryocoolers 100, 200 having heat exchangers that contain one or more portions created using additive manufacturing, various changes may be made to FIGS. 1, 2A, and 2B. For example, each regenerator 112, 212 or other heat exchanger could include any number of portions 118, 218. Also, while the portions 118, 218 are shown here as being physically separated, this is for ease of illustration only. The various portions 118, 218 of a cryocooler heat exchanger could have any suitable spacing(s) or physically contact one another. In addition, FIGS. 1, 2A, and 2B represent examples of cryocoolers that include heat exchangers containing one or more portions created using additive manufacturing. Such heat exchangers could be used in other types of cryocoolers, such as in a single-stage Stirling cryocooler or a Gifford-McMahon cryocooler. Moreover, the same or similar structure could be used in a recuperative heat exchanger, such as for a reverse turbo-Brayton cryocooler or a Joule-Thomson cryocooler. In general, any single-stage or multi-stage cryocooler could include a regenerator, recuperative heat exchanger, or other heat exchanger having at least one portion created using additive manufacturing.

Figure 3:
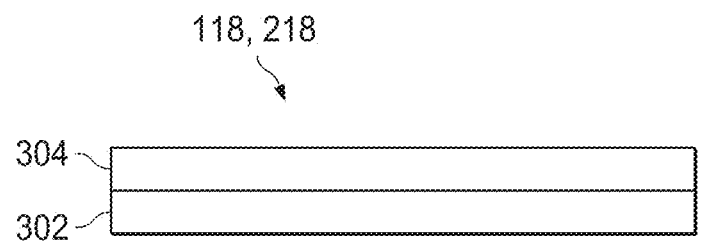
FIG. 3 illustrates an example portion of a cryocooler heat exchanger created using additive manufacturing in accordance with this disclosure.

FIG. 3 illustrates an example portion 118, 218 of a cryocooler heat exchanger created using additive manufacturing in accordance with this disclosure. As shown in FIG. 3, the portion 118, 218 of the cryocooler heat exchanger includes a substrate 302 and a nanoparticle layer 304. In some embodiments, the substrate 302 generally denotes a structure that includes at least one allotropic form of carbon. Also, in some embodiments, the nanoparticle layer 304 generally denotes a layer in which nanoparticles have been deposited (possibly in a pattern) on or over the substrate.

The substrate 302 includes any suitable material(s) on which nanoparticles or other materials can be deposited, formed, or otherwise placed. In particular embodiments, the substrate 302 is formed from any suitable allotropic form(s) of carbon, such as carbon nanotubes or graphene. The substrate 302 can also be formed in any suitable manner, such as by manufacturing or purchasing a sheet of carbon nanotubes or graphene.

The nanoparticle layer 304 includes nanoparticles formed from any suitable material(s). In particular embodiments, the nanoparticle layer 304 includes nanoparticles formed from erbium (Er), praseodymium (Pr), holmium (Ho), gadolinium (Gd), or other lanthanide element(s) or alloy(s). Note, however, that the nanoparticles could be formed from any suitable material(s) having a very high volumetric specific heat at very low temperatures. Other example materials could include lead (Pb), nickel (Ni), or other element(s) or alloy(s). The nanoparticles can also be deposited in any suitable manner. Example techniques include printing an ink containing suspended nanoparticles onto a substrate using an inkjet printer.

As described in more detail below, the porosity of the substrate 302 and the patterns formed using the nanoparticles in the nanoparticle layer 304 can be controlled or modified in order to achieve desired heat transfer characteristics, fluid flow characteristics, or other characteristics in a heat exchanger. For example, after the nanoparticles are deposited on a substrate, the structure could undergo one or more post-production processing operations to create pores of one or more desired sizes in the structure. This could be accomplished in any suitable manner, such as by using one or more lasers. In some embodiments, the porosity can be controlled so as to be high enough to not substantially impede the flow of fluid in the heat exchanger, and a reduced pressure drop within the heat exchanger compared to conventional structures could be obtained.

Combining the use of substrates formed from carbon allotropes and nanoparticles can provide various advantages depending on the implementation. For example, any heat flow within a heat exchanger between the warm and cold ends of a cryocooler reduces the overall cooling capacity and effectiveness of the cryocooler. However, substrates formed from carbon allotropes like carbon nanotubes or graphene easily allow heat to travel radially or laterally (right/left in FIG. 1 or up/down in FIG. 2B) while substantially blocking heat from traveling axially (up/down in FIG. 1 or right/left in FIG. 2B) in a heat exchanger. In this document, the term "axial" refers to a direction substantially parallel to an axis of a heat exchanger along a longer dimension of the heat exchanger. The terms "radial" and "lateral" refer to a direction substantially perpendicular to the axial direction. By supporting heat transfer in this manner, axial heat flows within the heat exchanger can be substantially reduced while radial/lateral heat transfers into and out of the nanoparticle layer 304 can be improved, reducing end-to-end thermal conduction losses in the heat exchanger and helping to increase the overall cooling capacity and effectiveness of the cryocooler.

As another example, the deposition of nanoparticles can be precisely controlled to achieve feature sizes much smaller than using conventional cryocooler manufacturing techniques. For example, printing ink that contains the nanoparticles onto a substrate could be done with feature sizes as small as about five to ten microns (or even smaller). This facilitates the design of a heat exchanger with much lower pressure losses while still accomplishing the desired heat transfer. This can also allow significantly higher-frequency operation relative to conventional low-temperature cryocoolers. This is because smaller feature sizes facilitate more rapid heat exchanges over smaller distances between the substrate 302/nanoparticle layer 304 and the fluid in the cryocooler.

These and other characteristics enable the cryocoolers 100, 200 to operate at higher frequencies in smaller packages. For example, many conventional cryocoolers that attempt to reach temperatures of 4 Kelvin often operate at frequencies between 1 Hertz (Hz) and 20 Hz. The approach described in this patent document can be used at higher frequencies, such as between about 30 Hz to about 60 Hz. Since the size/mass of a cryocooler typically scales inversely to its frequency, this helps to reduce the size/mass of the cryocoolers 100, 200. Moreover, these and other characteristics enable the cryocoolers 100, 200 to achieve efficiency gains from the more effective use of solid materials. In addition, these and other characteristics enable the cryocoolers 100, 200 to reduce pressure drops and reduce conduction losses in the cryocoolers 100, 200. Overall, this allows the cryocoolers 100, 200 to more efficiently and effectively achieve lower cryogenic temperatures, such as temperatures below 20 Kelvin (including about 10 Kelvin or about 4 Kelvin).

Although FIG. 3 illustrates one example of a portion 118, 218 of a cryocooler heat exchanger created using additive manufacturing, various changes may be made to FIG. 3. For example, additional layers of material(s) could be used in any suitable location(s). Also, this disclosure is not limited to use with just carbon allotropes and nanoparticles in a heat exchanger. Various other structures and techniques (such as chemical vapor deposition) can be used to additively manufacture a heat exchanger for a cryocooler. As particular examples, the following chemical vapor deposition (CVD) techniques can be used to apply one or more lanthanide alloys. One example technique utilizes starting material in the form of spheres/pellets that have a desired metal/alloy composition and that are heated under vacuum to directly deposit the metal/alloy onto a sheet substrate. Another example technique applies sub-micron layers of each lanthanide or other metal to form a stack, and the stack is later exposed to an elevated temperature to promote inter-diffusion between each metal layer (thus forming an alloy).

Figure 4:
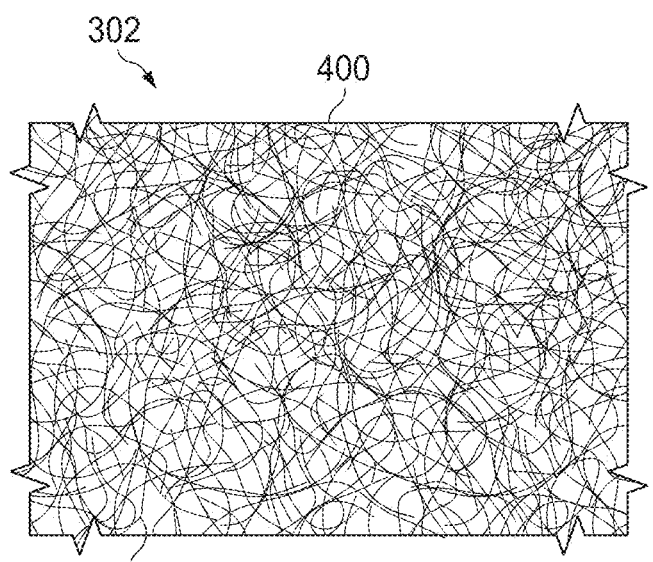
FIGS. 4 and 5 illustrate example substrates for a cryocooler heat exchanger in accordance with this disclosure.
Figure 5:
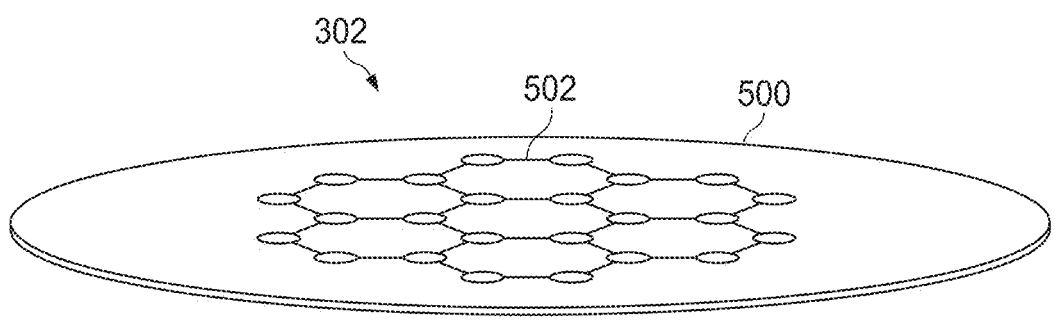

FIGS. 4 and 5 illustrate example substrates for a cryocooler heat exchanger in accordance with this disclosure. More specifically, FIGS. 4 and 5 illustrate example substrates 302 that could be used in different portions 118, 218 in the regenerators 112, 212 of FIGS. 1, 2A, and 2B or in any other suitable cryocooler heat exchanger.

FIG. 4 shows a close-up view of a portion of a sheet 400 of carbon nanotubes 402. As can be seen in FIG. 4, the carbon nanotubes 402 are generally planar and travel substantially laterally within the sheet 400. The carbon nanotubes 402 here travel random paths within the sheet 400, although more regular paths could be imparted in a sheet 400.

This arrangement of carbon nanotubes 402 allows fluid to flow through the sheet 400 and contact the carbon nanotubes 402 and the nanoparticles in the adjacent nanoparticle layer(s) 304. Heat transfer can occur between the fluid and the carbon nanotubes 402. Heat transfer can also occur between the carbon nanotubes 402 and the nanoparticles in the adjacent nanoparticle layer(s) 304 (where heat transfer is occurring between the fluid and the nanoparticles). The porosity of the sheet 400 can be controlled based on, for example, the quantity and size(s) of the carbon nanotubes 402 within the sheet 400, as well as any post-production processing operations (such as laser etching through the sheet 400). Also, the overall size and shape of the sheet 400 can be based on various factors, such as the desired volumetric heat capacity and shape of the heat exchanger.

Heat transport within the sheet 400 generally occurs along the carbon nanotubes 402. As can be seen in FIG. 4, the carbon nanotubes 402 generally travel laterally (side to side) within the sheet 400. As a result, a significant portion of the heat transported through the carbon nanotubes 402 is transported laterally within the sheet 400. To the small extent the carbon nanotubes 402 travel axially (top to bottom) within the sheet 400, this results in a significantly smaller amount of heat transport axially within the sheet 400. Note that it is also possible to dope or co-deposit the carbon nanotubes 402 with one or more other materials to adjust the volumetric thermal capacity of the heat exchanger.

In FIG. 5, a sheet 500 of graphene (sometimes referred to as "graphene paper") is used. As can be seen in FIG. 5, the sheet 500 represents a thin structure formed using a condensed hexagonal matrix 502 of carbon atoms. Pores can be formed through the sheet 500 of graphene in any suitable manner, such as via laser etching. This allows fluid to flow through the sheet 500 and contact the graphene. Heat transfer can occur between the fluid and the graphene, and heat transfer can also occur between the nanoparticles in the adjacent nanoparticle layer(s) 304 and the graphene (where heat transfer is occurring between the fluid and the nanoparticles). Note that while shown as being in the shape of a disc, the overall size and shape of the sheet 500 can be based on various factors, such as the desired volumetric heat capacity and shape of the heat exchanger.

Once again, heat transport within the sheet 500 generally occurs laterally within the sheet 500, mainly along the matrix 502 of carbon atoms. Since the matrix 502 is arranged laterally (side to side) within the sheet 500, a significant portion of the heat transported through the matrix 502 is transported laterally within the sheet 500. To the small extent the matrix 502 travels axially (top to bottom) within the sheet 500, this results in a significantly smaller amount of heat transport axially within the sheet 500.

Although FIGS. 4 and 5 illustrate examples of substrates for a cryocooler heat exchanger, various changes may be made to FIGS. 4 and 5. For example, each portion 118, 218 could have any suitable form factor, such as a rectangular sheet, circular disc, toroidal disc, or other regular or irregular shape. Also, as noted above, this disclosure is not limited to use with substrates containing carbon allotropes.

Figure 6:
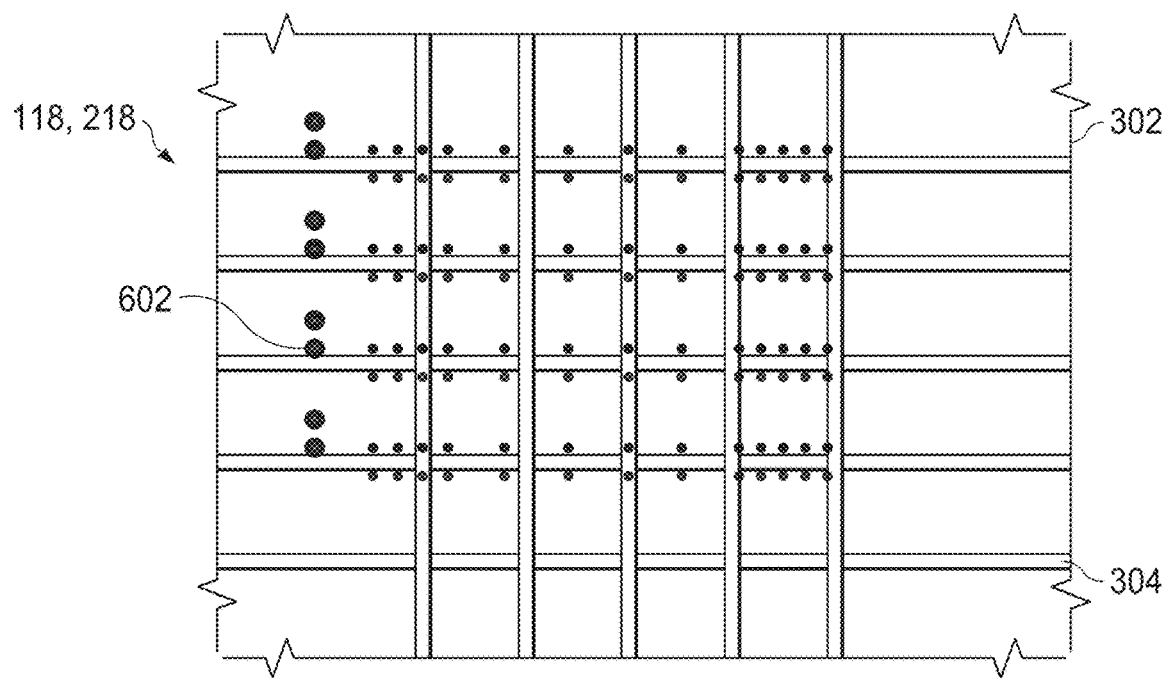
FIG. 6 illustrates a specific example of a portion of a cryocooler heat exchanger created using additive manufacturing in accordance with this disclosure.

FIG. 6 illustrates a specific example of a portion 118, 218 of a cryocooler heat exchanger created using additive manufacturing in accordance with this disclosure. In this example, the nanoparticle layer 304 has been printed in a grid pattern with horizontal and vertical lines of nanoparticles. Note, however, that other or additional patterns of nanoparticles could be used.

Also as shown in FIG. 6, pores 602 have been formed in the structure. The pores 602 denote passages for fluid to flow through the portion 118, 218 of the cryocooler heat exchanger. The pores 602 can be formed in any suitable manner, such as by laser etching. Any suitable number of pores could be formed in any suitable pattern.

In embodiments where printing is used to deposit the nanoparticles, the printing and laser processes can allow for precise control over parameters such as porosity, hydraulic and solid feature sizes, feature spacing, and patterns. In some embodiments, feature sizes of about five to ten microns for both the printed nanoparticle material (grid lines forming the layer 304) and flow passages (pores 602) can be used.

Although FIG. 6 illustrates one specific example of a portion 118, 218 of a cryocooler heat exchanger created using additive manufacturing, various changes may be made to FIG. 6. For example, other or additional regular or irregular arrangements of nanoparticles and pores could be used. Also, the use of pores 602 is not limited to the specific implementation of the substrate 302 and nanoparticle layer 304 shown in FIG. 6. In addition, as noted above, this disclosure is not limited to use with nanoparticles.

Figure 7:
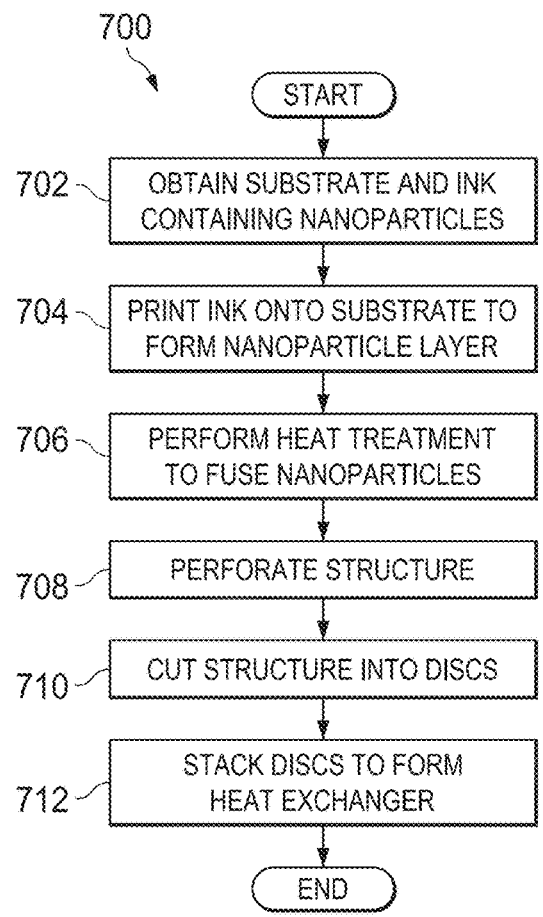
FIGS. 7 through 9 illustrate example methods for forming a cryocooler heat exchanger using additive manufacturing in accordance with this disclosure.
Figure 8:
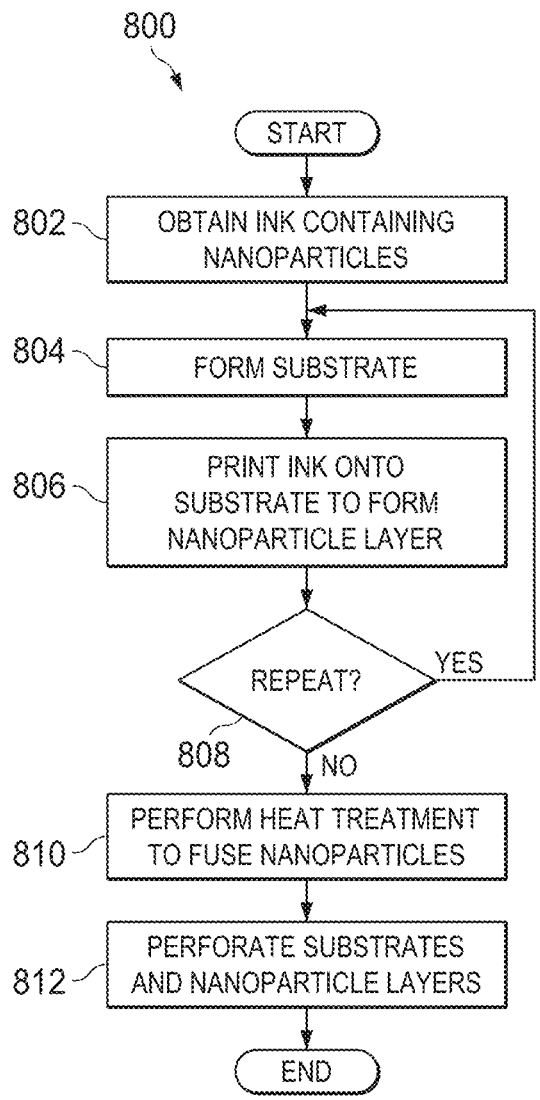
Figure 9:
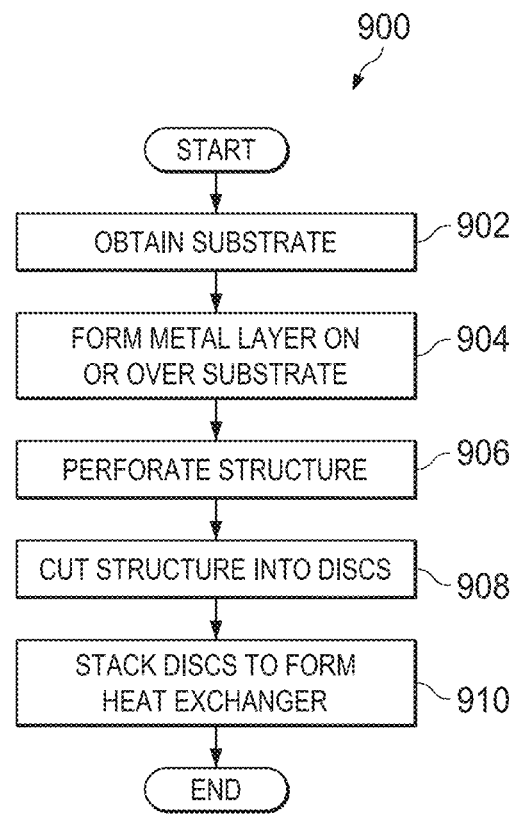

FIGS. 7 through 9 illustrate example methods 700, 800, 900 for forming a cryocooler heat exchanger using additive manufacturing in accordance with this disclosure. As shown in FIG. 7, a substrate and an ink containing nanoparticles are obtained at step 702. This could include, for example, manufacturing, purchasing, or otherwise obtaining a sheet of carbon nanotubes or graphene. This could also include manufacturing, purchasing, or otherwise obtaining an ink containing lanthanide element, lanthanide alloy, or other nanoparticles.

The ink is printed onto the substrate to form a nanoparticle layer at step 704. This could include, for example, using an inkjet printer to print the ink onto the substrate. Any suitable inkjet printer could be used, such as an OPTOMEC AEROJET printer. Also, the ink could be deposited in any suitable manner, such as in a grid pattern or other pattern.

A heat treatment is performed to fuse the nanoparticles in the nanoparticle layer at step 706. This could include, for example, performing a heat treatment at about 150° C. (about 302° F.). As a particular example, this could include performing a photo-sintering process. The heat treatment fuses the nanoparticles in order to help ensure continuity in the grid pattern or other pattern(s) formed using the nanoparticles.

The structure is perforated at step 708. This could include, for example, forming pores through the substrate using a laser. Depending on the location of the pores, this may or may not include forming pores through the nanoparticle pattern. The structure is cut into discs at step 710, and the discs are stacked to form a heat exchanger at step 712. This could include, for example, using a laser to cut the structure into discs. This could also include using a suitable bonding agent or other mechanism to stack the discs. Note that the use of discs is for illustration only and that the heat exchanger could have sections of any other desired cross-sectional shape. The resulting structure can represent a completed heat exchanger, or other processing steps could be performed to complete fabrication of a completed heat exchanger.

As shown in FIG. 8, an ink containing nanoparticles is obtained at step 802. This could include, for example, manufacturing, purchasing, or otherwise obtaining an ink containing lanthanide element, lanthanide alloy, or other nanoparticles.

A substrate is formed at step 804. This could include, for example, using an inkjet printer or other device to form carbon nanotubes or graphene into the shape of a desired substrate. Note, however, that any other suitable technique could be used to create a substrate containing, for example, an allotropic form of carbon. The ink is printed onto the substrate to form a nanoparticle layer at step 806. This could include, for example, using an inkjet printer to print the ink onto the substrate in a grid pattern or other pattern(s).

A decision is made whether to form any additional substrate and nanoparticle layers at step 808. This could include, for example, determining whether a desired number of substrate and nanoparticle layers have been fabricated. If additional substrate and nanoparticle layers are needed, the process returns to step 804 where another substrate can be formed on or over the previously-fabricated nanoparticle layer.

Otherwise, a heat treatment is performed to fuse the nanoparticles in the nanoparticle layers at step 810, and the structure is perforated at step 812. This could include, for example, performing a photo-sintering process or other heat treatment at about 150° C. (about 302° F.) or other temperature. This could also include forming pores through the substrates using a laser. The resulting structure can represent a completed heat exchanger, or other processing steps could be performed to complete fabrication of a completed heat exchanger.

As shown in FIG. 9, a substrate is obtained at step 902. This could include, for example, manufacturing, purchasing, or otherwise obtaining a sheet of carbon nanotubes or graphene. Note, however, that the substrate could be formed from any other suitable material(s).

A layer of metal is formed on or over the substrate at step 904. This could include, for example, printing ink containing metallic nanoparticles (such as one or more lanthanide metals or alloys) onto the substrate to form a nanoparticle layer. This could also include using a CVD technique. As noted above, one CVD technique heats spheres/pellets that have a desired metal or alloy composition under vacuum to directly deposit the metal/alloy onto a sheet substrate. Another CVD technique forms multiple layers of metal and heats the metal to form an alloy.

The structure is perforated at step 906. This could include, for example, forming pores through the structure using a laser. The structure is cut into discs at step 908, and the discs are stacked to form a heat exchanger at step 910. This could include, for example, using a laser to cut the structure into discs. This could also include using a suitable bonding agent or other mechanism to stack the discs. Note that the use of discs is for illustration only and that the heat exchanger could have sections of any other desired cross-sectional shape. The resulting structure can represent a completed heat exchanger, or other processing steps could be performed to complete fabrication of a completed heat exchanger.

Although FIGS. 7 through 9 illustrate examples of methods 700, 800, 900 for forming a cryocooler heat exchanger using additive manufacturing, various changes may be made to FIGS. 7 through 9. For example, while each figure shows a series of steps, various steps in each figure could overlap, occur in parallel, occur in a different order, or occur multiple times. Also, other additive manufacturing techniques could be used.

The nanoparticles described above could be manufactured using any suitable technique now known or developed in the future. For example, in some embodiments, the technique described in U.S. Pat. No. 7,789,935 (which is hereby incorporated by reference in its entirety) can be used to fabricate nanoparticles used as described above.

In other embodiments, the technique described in U.S. Pat. No. 7,789,935 can be modified to support the manufacture of lanthanide element or lanthanide alloy nanoparticles. Because lanthanide elements react with water to produce hydrogen gas and metal hydroxides, lanthanide nanoparticles can be manufactured using organic or other non-aqueous solutions.

In still other embodiments, lanthanide nanoparticles can be manufactured as described in U.S. patent application Ser. No. 14/542,150 (which is hereby incorporated by reference in its entirety). In accordance with that approach, lanthanide nanoparticles can be manufactured using a lanthanide compound (such as a metallic salt) dissolved in an organic solvent (such as an alcohol) or other non-aqueous liquid. This solution is mixed with another solution containing a photo-initiator (such as benzophenone) in an organic solvent (such as an alcohol) or other non-aqueous liquid. Before, during, or after the mixing, the solution(s) can be degassed in order to substantially remove one or more dissolved gasses (such as oxygen) in the solution(s). The resulting mixture is exposed to ultraviolet (UV) illumination for at least a specified amount of time, and the mixture is dried. The remaining residue contains lanthanide nanoparticles.

In particular embodiments, lanthanide nanoparticles can be manufactured as follows. A solution containing approximately $10^{-3}$M benzophenone in High Performance Liquid Chromatography (HPLC) grade isopropyl alcohol is prepared, and another solution containing approximately $10^{-3}$M high purity anhydrous erbium chloride in HPLC-grade isopropyl alcohol is prepared. Dry nitrogen can be bubbled through these solutions, such as for a minimum of about 15 minutes, to degas dissolved oxygen from the solutions. Approximately 50 ml of the benzophenone solution is mixed with approximately 25 ml of the erbium solution and placed in a container, such as a Petri dish. The container is exposed to UV illumination, such as from a mercury lamp or other UV benchtop light, for a suitable length of time (such as between about two to about ten minutes). The mixture is dried, such as in an active airflow at room temperature for about 12 hours, and the resulting residue contains erbium nanoparticles.

Note that U.S. Pat. No. 7,789,935 incorporated by reference above also discloses techniques for formulating inks that contain nanoparticles, which could be used here. However, any other technique now known or developed in the future could be used to formulate inks containing lanthanide or other nanoparticles.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a heat exchanger configured to transfer heat to a fluid and to absorb heat from the fluid as the fluid flows in a fluid flow direction between a warm end and a cold end of a cryocooler;
   wherein the heat exchanger includes at least one section comprising:
      a substrate comprising at least one allotropic form of carbon, the substrate configured to substantially block transfer of heat within the substrate substantially parallel to the fluid flow direction such that the substrate allows heat transfer within the substrate substantially perpendicular to the fluid flow direction more easily than heat transfer within the substrate substantially parallel to the fluid flow direction; and
      a layer of nanoparticles on or over the substrate.

2. The apparatus of claim 1, wherein:
   the at least one section of the heat exchanger comprises multiple sections; and
   the multiple sections collectively comprise multiple substrates and multiple layers of nanoparticles.

3. The apparatus of claim 2, wherein the heat exchanger further comprises pores through the multiple sections of the heat exchanger, the pores configured to allow the fluid to flow through the heat exchanger and to contact the substrates and the layers of nanoparticles.

4. The apparatus of claim 2, wherein the multiple sections are stacked to form the heat exchanger.

5. The apparatus of claim 1, wherein the nanoparticles are arranged in a grid pattern on or over the substrate.

6. The apparatus of claim 1, wherein:
the nanoparticles comprise at least one lanthanide element or alloy; and
the substrate comprises carbon nanotubes or graphene.

7. The apparatus of claim 1, further comprising:
an ink forming part of the layer of nanoparticles.

8. The apparatus of claim 1, wherein:
the substrate has a substantially planar surface that is oriented substantially perpendicular to the fluid flow direction;
the layer of nanoparticles is on or over the substantially planar surface of the substrate; and
the nanoparticles are arranged substantially parallel to the substantially planar surface of the substrate.

9. A method comprising:
forming a heat exchanger for a cryocooler, the heat exchanger configured to contain a fluid that flows in a fluid flow direction;
wherein forming the heat exchanger comprises forming multiple sections of the heat exchanger, each section of the heat exchanger comprising:
a substrate comprising at least one allotropic form of carbon, the substrate configured to substantially block transfer of heat within the substrate substantially parallel to the fluid flow direction such that the substrate allows heat transfer within the substrate substantially perpendicular to the fluid flow direction more easily than heat transfer within the substrate substantially parallel to the fluid flow direction; and
a layer of nanoparticles on or over the substrate.

10. The method of claim 9, wherein forming the heat exchanger comprises forming alternating substrates and layers of nanoparticles.

11. The method of claim 9, wherein forming the heat exchanger comprises:
depositing the layer of nanoparticles on or over the substrate;
cutting the substrate and the layer of nanoparticles into sections; and
stacking the sections to form the heat exchanger.

12. The method of claim 9, wherein forming each section of the heat exchanger comprises:
forming the substrate for that section; and
depositing the layer of nanoparticles for that section on or over the substrate for that section.

13. The method of claim 9, further comprising:
for each section, fusing the nanoparticles in the layer of nanoparticles.

14. The method of claim 9, further comprising:
forming pores through the sections of the heat exchanger, the pores configured to allow a fluid to flow through the heat exchanger and to contact the substrates and the layers of nanoparticle.

15. The method of claim 9, wherein forming the heat exchanger comprises:
for each section, printing an ink containing the nanoparticles on or over the substrate to form the layer of nanoparticles.

16. A method comprising:
forming a heat exchanger for a cryocooler, the heat exchanger configured to contain a fluid that flows in a fluid flow direction;
wherein forming the heat exchanger comprises forming multiple sections of the heat exchanger, each section of the heat exchanger comprising a substrate and a layer of metal on or over the substrate such that the heat exchanger comprises alternating substrates and layers of metal; and
wherein the substrate of each section is configured to substantially block transfer of heat within the substrate substantially parallel to the fluid flow direction such that the substrate allows heat transfer within the substrate substantially perpendicular to the fluid flow direction more easily than heat transfer within the substrate substantially parallel to the fluid flow direction.

17. The method of claim 16, wherein:
the layer of metal in each section comprises a layer of nanoparticles; and
each layer of metal is formed by depositing an ink containing the nanoparticles.

18. The method of claim 17, wherein the nanoparticles comprise at least one lanthanide element or alloy.

19. The method of claim 17, wherein the layer of metal in each section is formed by heating spheres or pellets of metal under vacuum to directly deposit the layer of metal.

20. The method of claim 17, wherein the layer of metal in each section is formed by depositing multiple layers of metal to form a stack and heating the multiple layers of metal to form an alloy.

21. A method comprising:
forming a heat exchanger for a cryocooler, wherein forming the heat exchanger comprises forming multiple sections of the heat exchanger, each section of the heat exchanger comprising a substrate and a layer of metal on or over the substrate such that the heat exchanger comprises alternating substrates and layers of metal;
wherein the layer of metal in each section comprises a layer of nanoparticles;
wherein each layer of metal is formed by depositing an ink containing the nanoparticles;
wherein the nanoparticles comprise at least one lanthanide element or alloy; and
wherein the method further comprises fabricating the nanoparticles by dissolving a metallic salt in a non-aqueous liquid to form a first solution, mixing the first solution with a second solution comprising a photo-initiator in a non-aqueous liquid, and exposing a resulting mixture to ultraviolet illumination.

\* \* \* \* \*